United States Patent
Kauppila et al.

(10) Patent No.: US 6,539,829 B1
(45) Date of Patent: Apr. 1, 2003

(54) ROTARY VALVE ASSEMBLY AND METHOD

(75) Inventors: Greg M. Kauppila, Ashland, WI (US); Andrew P. Tijan, Hurley, WI (US)

(73) Assignee: C. G. Bretting Manufacturing Company, Inc., Ashland, WI (US)

( * ) Notice: Subject to any disclaimer, the term of this patent is extended or adjusted under 35 U.S.C. 154(b) by 0 days.

(21) Appl. No.: 09/325,294

(22) Filed: Jun. 3, 1999

(51) Int. Cl.[7] .................................................. B26D 1/00
(52) U.S. Cl. ................................. 83/13; 83/98; 83/100; 83/698.41
(58) Field of Search .................... 83/674, 663, 698.31, 83/698.41, 98–100, 169, 304, 305, 13; 251/208; 137/625.46, 625.18, 580; 198/689.1; 492/4

(56) References Cited

U.S. PATENT DOCUMENTS

| | | |
|---|---|---|
| 940,933 A | 11/1909 | Klein |
| 1,053,914 A | 2/1913 | Hudson |
| 1,566,079 A | 12/1925 | Christman, Jr. et al. |
| 1,595,992 A | 8/1926 | Cannard et al. |
| 1,602,647 A * | 10/1926 | Carr ........................... 137/580 |
| 1,738,354 A | 12/1929 | Cannard |
| 1,886,312 A | 11/1932 | Stanton |
| 1,974,149 A | 9/1934 | Christman |
| 1,992,179 A | 2/1935 | Blosser et al. |
| 2,092,952 A | 9/1937 | Campbell |
| 2,631,845 A | 3/1953 | Zuckerman |
| 2,631,846 A | 3/1953 | Sabee |
| 2,723,604 A | 11/1955 | Fischer |
| 2,784,784 A * | 3/1957 | Haumann ................. 198/689.1 |
| 2,872,186 A | 2/1959 | Raybuck |
| 2,929,624 A | 3/1960 | Brooker |
| 3,040,777 A * | 6/1962 | Carson et al. ......... 137/625.15 |
| 3,163,413 A | 12/1964 | Franke et al. |
| 3,174,372 A | 3/1965 | Huck |
| 3,174,428 A | 3/1965 | Huck |

(List continued on next page.)

FOREIGN PATENT DOCUMENTS

| | | |
|---|---|---|
| DE | 372031 | 3/1923 |
| DE | 442935 | 4/1927 |
| DE | 719833 | 4/1942 |
| DE | 2123243 | 11/1972 |
| GB | 321873 | 11/1929 |
| SE | 116974 | 8/1946 |

*Primary Examiner*—Kenneth E. Peterson
*Assistant Examiner*—Omar Flores-Sánchez
(74) *Attorney, Agent, or Firm*—Michael Best & Friedrich LLP

(57) ABSTRACT

A fluid valve for controlling fluid flow and/or vacuum to a plurality of ports and fluid lines in a rotating member has a rotary phase plate with a plurality of apertures therein which can be brought into fluid communication with selected ports and fluid lines in the rotating member by rotation of the rotary phase plate to one of at least two rotational positions with respect to the rotating member. Preferably, the fluid valve has at least a rotary union adapter coupling the rotary phase plate to a one-port rotary union or a roll adapter coupling the rotary phase plate to the rotating member. Most preferably, the fluid valve has both such adapters. By rotating the rotary phase plate with respect to the rotary union adapter and the roll adapter, certain apertures in the rotary union adapter are brought into fluid communication with one or more aligned fluid lines in the rotary union adapter and the roll adapter, and certain apertures in the rotary union adapter are brought out of fluid communication with one or more aligned fluid lines in the rotary union adapter and the roll adapter. Rotation of the rotary phase plate therefore causes fluid lines or patterns of fluid lines from the rotary union to the rotating member to open or close, thereby permitting or stopping fluid flow through the lines (or connecting or disconnecting the rotating member to a vacuum source).

17 Claims, 6 Drawing Sheets

U.S. PATENT DOCUMENTS

| | | |
|---|---|---|
| 3,186,274 A | 6/1965 | Winkler et al. |
| 3,214,162 A | 10/1965 | Breidenbach et al. |
| 3,247,746 A | 4/1966 | Nystrand |
| 3,251,256 A | 5/1966 | McGrath |
| 3,302,503 A | 2/1967 | Hornung |
| 3,314,340 A | 4/1967 | Bishop |
| 3,466,029 A | 9/1969 | Jensen et al. |
| 3,489,406 A | 1/1970 | Nystrand |
| 3,490,762 A | 1/1970 | Nystrand |
| 3,494,175 A * | 2/1970 | Cusick et al. ............... 137/580 |
| 3,572,681 A | 3/1971 | Nystrand |
| 3,689,061 A | 9/1972 | Nystrand |
| 3,709,077 A | 1/1973 | Trogan et al. |
| 3,747,630 A * | 7/1973 | Hurrell ....................... 137/312 |
| 3,748,187 A | 7/1973 | Aubuchon et al. |
| 3,784,187 A | 1/1974 | Takayanagi et al. |
| 3,834,689 A | 9/1974 | Lee et al. |
| 3,948,504 A | 4/1976 | Woessner et al. |
| 3,991,994 A | 11/1976 | Farish |
| 4,070,014 A | 1/1978 | Takahashi |
| 4,163,548 A | 8/1979 | Nystrand |
| 4,190,242 A | 2/1980 | Schunemann |
| 4,254,947 A | 3/1981 | Trogan |
| 4,270,744 A | 6/1981 | Trogan |
| 4,279,410 A | 7/1981 | Schunemann |
| 4,332,583 A | 6/1982 | Stemmler et al. |
| 4,349,185 A | 9/1982 | Small et al. |
| 4,475,730 A | 10/1984 | Trogan |
| 4,494,741 A | 1/1985 | Fischer et al. |
| 4,550,821 A * | 11/1985 | Horie et al. ................. 198/416 |
| 4,723,390 A | 2/1988 | Duke |
| 5,383,493 A * | 1/1995 | Brandauer et al. ..... 137/625.46 |
| 5,771,770 A * | 6/1998 | Muller .................... 83/698.61 |
| 5,799,692 A * | 9/1998 | Gobell et al. ............... 137/580 |

* cited by examiner

ROTARY VALVE ASSEMBLY AND METHOD

FIELD OF THE INVENTION

This invention relates generally to devices and methods for controlling pressure and flow in a rotating member, and more particularly to devices and method for fluid flow and pressure control to or from a roll in a web manipulating device such as a cutoff roll.

BACKGROUND OF THE INVENTION

Numerous applications exist in which it is necessary to supply pressurized fluid or a suction force to a rotating member. For example, the control, manipulation, and cutting of web material upon machinery rolls can be necessary for proper transfer and processing of such materials as paper, fabric, foil, and film. The term "web" as used herein and in the appended claims means any type of material (e.g., paper, composites, plastic or other synthetic material, metal, and the like) which can be found in sheet form, regardless of sheet length, width, porosity, composition, density or weight. The web material may need to be cut or perforated by one or more retractable blades upon the roll, held to the surface of the roll by a suction force, and/or expelled therefrom by jets of fluid emitting from the roll. Each such operation can require the supply of pressurized fluid or the application of vacuum to the roll from a source external from the roll. For this purpose, rotating members are typically coupled for fluid communication at one or both ends to one or more rotary unions and associated valves.

Typically, the rotary union is coupled to a rotating valve which supplies the pressurized fluid or vacuum to one or more fluid lines in the rotating roll. Where it is desirable to control the distribution of pressurized fluid or vacuum to different locations upon the rotating roll (such as where fluid pressure or vacuum is to be applied to each portion of the roll only as it passes a certain point in its rotation, or where a fraction of pressure or vacuum-actuated blades are to be selected for actuation), the rotating valve can be controlled either manually or automatically to open or close pressurized fluid or vacuum to various locations of the roll. In conventional systems where this control is desired, multiple rotary unions are connected to the valves at the ends of the rotating roll. Necessarily, each rotary union must have one or more fluid-tight seals to the valves and/or associated elements. Increased control of pressurized fluid or vacuum distribution to the various locations of the roll therefore comes at the cost of increased system size, complexity, and expense, and with increased maintenance requirements of multiple seals, rotary unions, and associated equipment. Additionally, the ability to control pressurized fluid and/or vacuum to various locations of a roll in conventional systems is fairly limited, typically preventing a user from being able to choose from a number of flow, pressure and/or vacuum patterns or regions on the roll.

In light of the problems and limitations of the prior art described above, a need exists for a valve which is capable of distributing pressurized fluid or vacuum to user-selected locations and/or one or more patterns of user-selected locations on a rotating member such as a cutoff roll, perforation roll, or vacuum roll, which is easily and quickly adjustable to change the distribution of pressurized fluid or vacuum to the user-selected locations, and which is preferably connected via a one-port rotary union to a source of pressurized fluid or vacuum in order to increase the reliability and to reduce the manufacturing and maintenance costs of the valve. Each preferred embodiment of the present invention achieves one or more of these results.

SUMMARY OF THE INVENTION

The present invention employs a rotary phase plate which acts either alone or in conjunction with a rotary union adapter and/or a roll adapter to control the supply of pressurized fluid or vacuum from a one-port rotary union to a rotating member. The rotating member can be virtually any element or assembly to or from which fluid is passed for operations performed by the rotating member, and therefore can be used in many different applications. The rotating member can be a roll used to manipulate, control, perforate, or cut a web of material as discussed above. In such an application, it is desirable to control fluid flow and pressure to one or more selected fluid lines running along the length of the roll. Particularly in cases where regularly-spaced perforations or cuts (made by retractable blades upon the roll) are desired in the web of material passing the roll, it is also desirable to control fluid flow and pressure or vacuum to patterns of fluid lines in the roll. For example, where regularly spaced-apart blades upon the roll are extended by pressurizing fluid or vacuum lines leading to each respective blade, regularly spaced web perforations or cuts are created by permitting pressurized flow or vacuum only to those lines.

The rotary phase plate in the present invention provides flow and pressure or vacuum control to user-selected lines or patterns of lines. Specifically, the rotary phase plate has a pattern of apertures therein which substantially align with preferably regularly spaced fluid lines in the end of the roll. Rotation of the rotary phase plate with respect to the roll brings certain apertures of the rotary phase plate into fluid communication with certain fluid lines in the roll, and takes certain apertures of the rotary phase plate out of fluid communication with certain fluid lines in the roll, thereby providing pressurized flow or vacuum, or removing pressurized flow or vacuum to the fluid lines in the roll. The pattern of apertures in the rotary phase plate is preferably arranged so that two or more patterns of apertures in the rotary phase plate are aligned with fluid lines in the roll at different rotational positions of the rotary phase plate with respect to the roll.

More preferred embodiments of the present invention employ at least a roll adapter or a rotary union adapter coupled to the sides of the rotary phase plate. Most preferably, the rotary phase plate is sandwiched and held between a rotary union adapter and a roll adapter. The rotary union adapter connects the rotary union to the rotary phase plate, and has a series of fluid lines running from the connection port of the rotary union to equally-spaced ports open to the rotary phase plate. The roll adapter connects the rotary phase plate to the end of the roll, and has a series of fluid lines running from equally-spaced ports corresponding to the ports of the rotary union adapter to equally spaced ports open to the fluid lines in the end of the roll. When rotation of the rotary phase plate brings apertures therein in line with two corresponding ports in the rotary union adapter and the roll adapter, fluid communication is established from the rotary union to the roll fluid line corresponding to the ports in the adapters, thereby permitting flow to or creating a vacuum in the roll fluid line. Conversely, when rotation of the rotary phase plate brings apertures therein out of line with corresponding ports in the rotary union adapter and the roll adapter, fluid communication is cut between the rotary union and the roll fluid line corresponding to the ports in the adapters, thereby ceasing flow and vacuum to the roll fluid line. In this manner, rotation of the rotary phase plate controls flow and pressure or vacuum to selected fluid lines and patterns of fluid lines in the roll. The rotary phase plate can have multiple aperture patterns to create different combinations of open lines as the rotary phase plate is rotated.

Preferably, a significant torque must be applied to the rotary phase plate to rotate it with respect to the rotary union adapter and the roll adapter. This prevents unwanted rotation of the rotary phase plate during operation of the roll. O-rings, gaskets, washers, or other sealing elements or material sealing the aperture-to-port connections between the rotary phase plate, the rotary union adapter, and the roll adapter help to prevent unwanted rotary phase plate rotation. Also, a spring-loaded ball plunger is preferably seated within either the rotary union adapter or the roll adapter, and presses against a series of detents in the rotary phase plate to further prevent unwanted rotation of the rotary phase plate. Still other types of rotation hindering devices, elements, and materials can be used with the rotary phase plate of the present invention.

Still other advantages and features of the invention, together with the organization and manner of operation thereof, will become apparent from the following detailed description when taken in conjunction with the accompanying drawings wherein like elements have like numerals throughout the drawings.

BRIEF DESCRIPTION OF THE DRAWINGS

The present invention is further described with reference to the accompanying drawings, which show a preferred embodiment of the present invention. However, it should be noted that the invention as disclosed in the accompanying drawings is illustrated by way of example only. The various elements and combinations of elements described below and illustrated in the drawings can be arranged and organized differently to result in embodiments which are still within the spirit and scope of the present invention.

In the drawings, wherein like reference numerals indicate like parts.

DETAILED DESCRIPTION OF THE PREFERRED EMBODIMENTS

Figure 1:
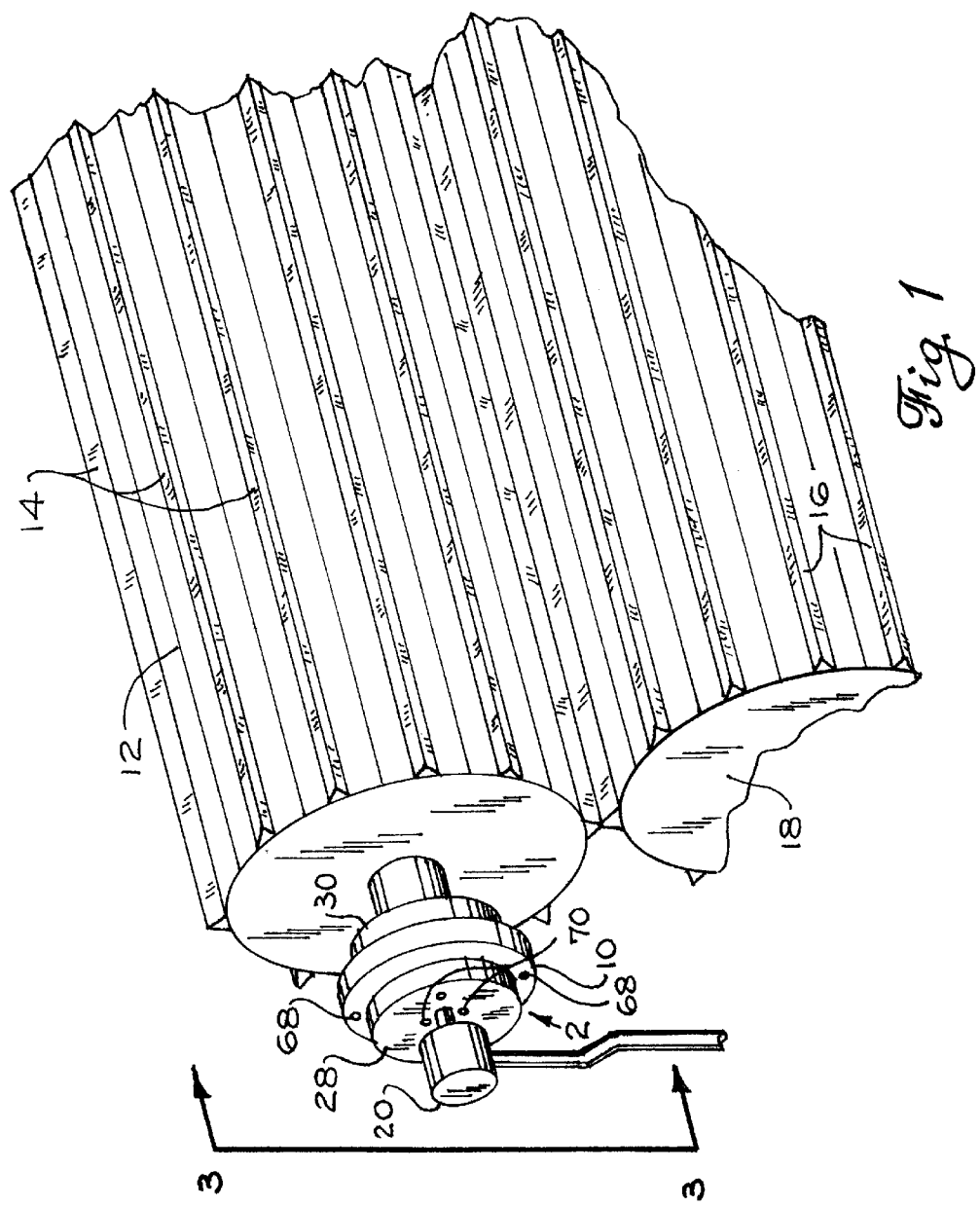
FIG. 1 is an assembled perspective view of the rotary valve assembly according to a preferred embodiment of the present invention, shown installed upon a perforation roll beside an anvil roll.

Each embodiment of the present invention employs a rotary phase plate 10 illustrated in the figures. The rotary phase plate 10 is preferably a round substantially flat body. However, it should be noted that the term "plate" as used herein and in the appended claims does not indicate or imply that the rotary phase plate 10 is of any particular shape, thickness or size. The shape and dimensions of the rotary phase plate 10 can vary significantly from that shown in the figures. The rotary phase plate 10 can be virtually any shape, although for purposes of balance, the illustrated circular shape is preferred. Also, the rotary phase plate 10 can be substantially thinner or thicker as desired, although the illustrated thickness provides sufficient strength to the plate without adding excessive weight to the connected system. A typical application in which the present invention is used is with a rotating perforation roll 12 in which a plurality of retractable blades 14 are secured to the roll 12 and are controlled by fluid flow or pressure (air, gas, liquid, or a combination thereof) to extend or retract into engagement with anvil blades 16 of a nearby rotating anvil roll 18. Such an application is illustrated by way of example in FIG. 1. Extendible and retractable blades are well-known to those skilled in the art and are therefore not described further herein. However, as discussed above, conventional systems and methods for extending or retracting the blades are generally either inefficient, complex or expensive to manufacture, and present a number of maintenance and failure problems.

It should be noted that the term "fluid" as used herein and in the appended claims is defined as any gaseous, liquid, or solid medium, or combinations thereof capable of flowing. Most commonly, the fluid used in the present invention will be air, gas, or a combination of air and gas.

To address the above-mentioned problems, the rotary phase plate 10 of the present invention is a valve or part of a valve assembly which selectively connects a conventional rotary union 20 to a series of roll inlet ports 22 on the perforation roll 12. The roll inlet ports 22 define the ends of a series of roll fluid lines 24 (see FIG. 3) passing axially along at least a portion of the length of the perforation roll 12 to the conventional elements or devices (not shown) which extend and retract the blades 14. These elements or devices can include a number of bladders which react to pressure changes in the roll fluid lines 24 by extending or retracting the blades 14. Such elements and devices are well known to those skilled in the art and are therefore not described further herein.

Figure 2:
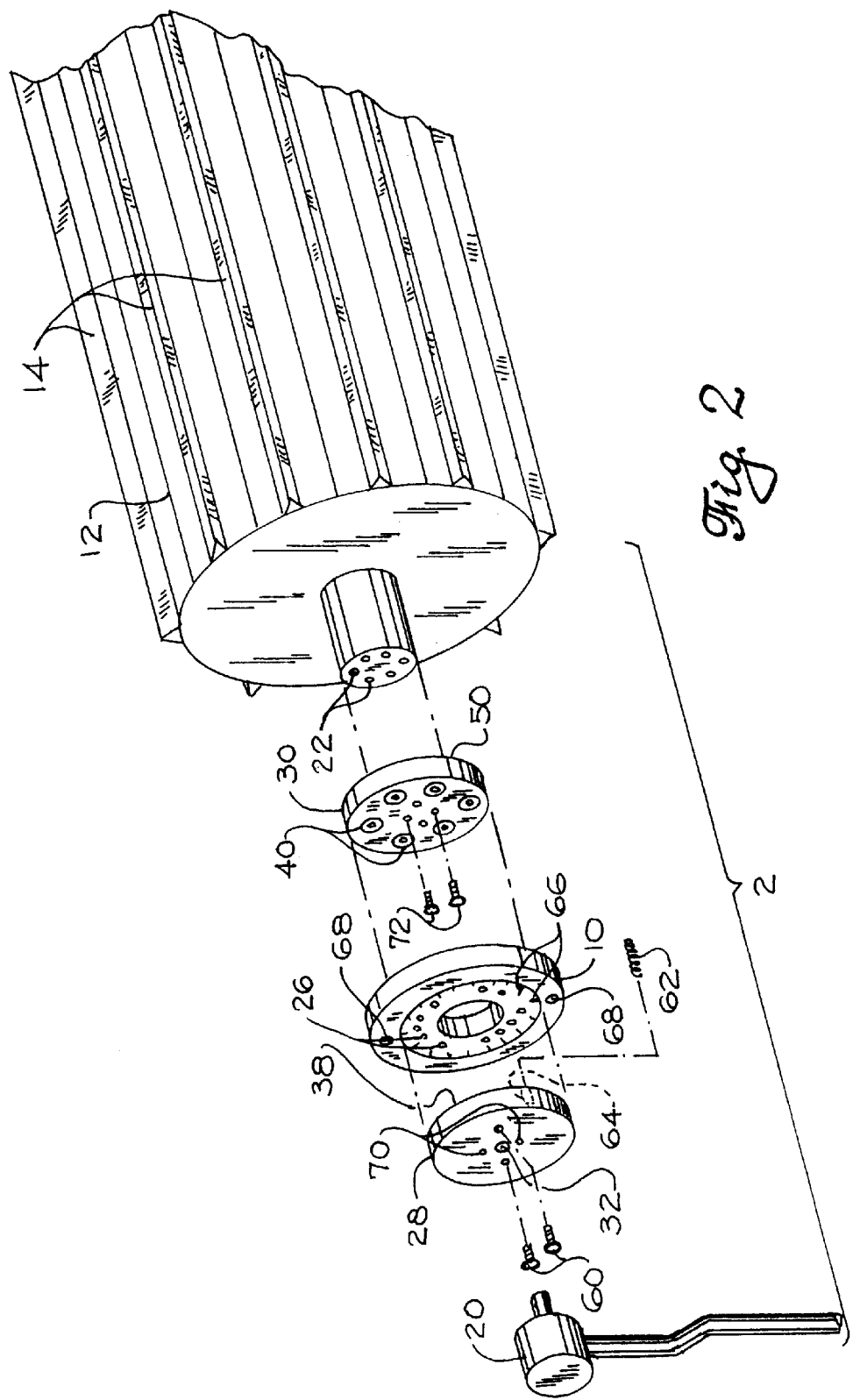
FIG. 2 is an exploded perspective view of the rotary valve assembly illustrated in FIG. 1, with the anvil roll removed.
Figure 3:
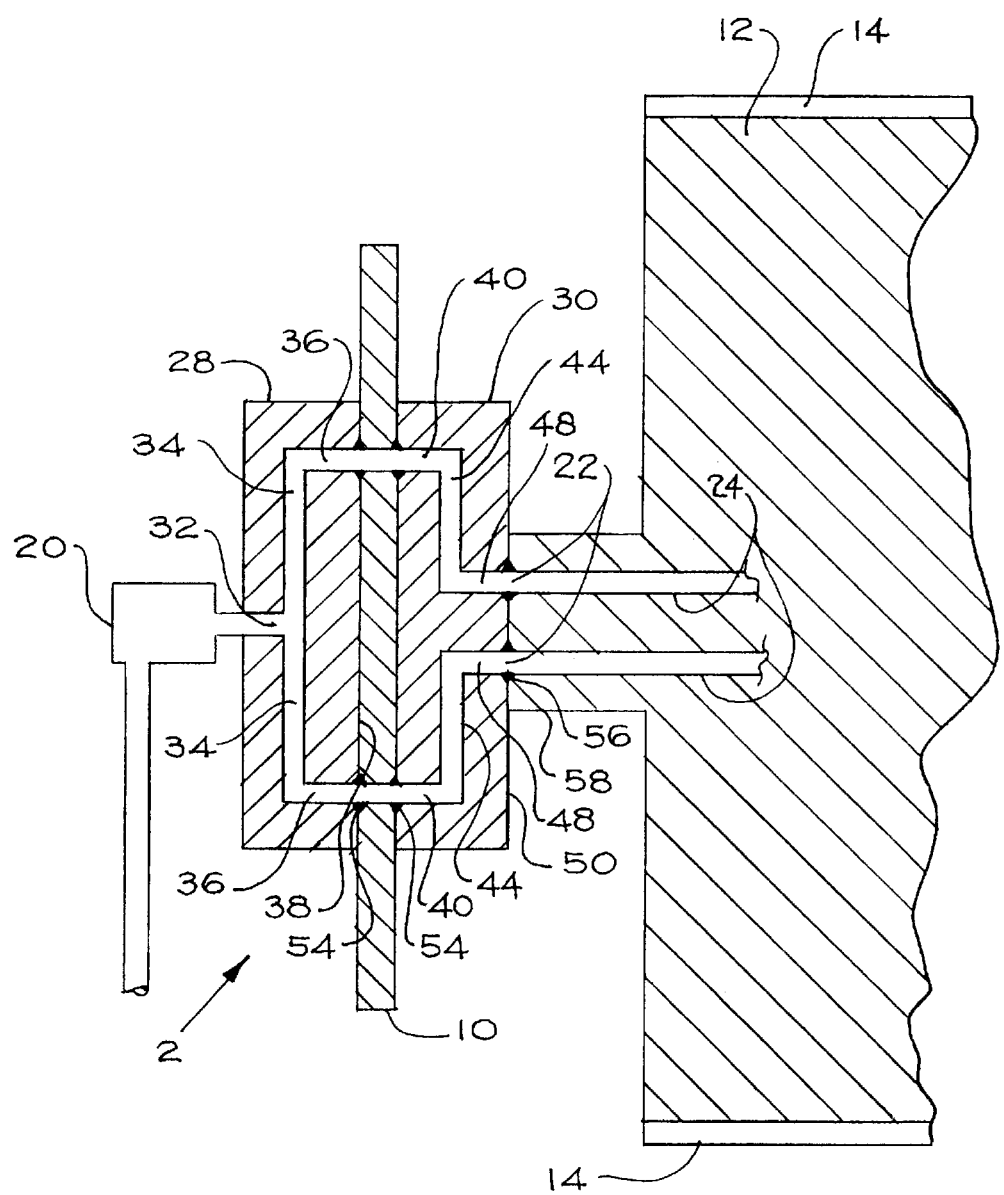
FIG. 3 is an cross sectional view of the rotary valve assembly and perforation roll end illustrated in FIGS. 1 and 2, taken along lines 3—3 in FIG. 1.

The perforation roll 12 illustrated in FIGS. 1–3 is one of a number of possible rotating members to which the present invention can be connected, and preferably has 12 equally spaced blades 14 around its circumference. Preferably, one roll fluid line 24 runs from each roll inlet port 22 (only two of each being visible in FIG. 3) on the end of the perforation roll 12 to a respective blade 14 or series of blades on the perforation roll 12 to control retraction and extension of the respective blade 14. Preferably, and particularly where smaller systems are involved, six radially equally spaced roll fluid lines 24 run to one end of the perforation roll 12 and six radially equally spaced fluid lines run to another end of the perforation roll 12. Therefore, when viewing the perforation roll 12 from an end as shown in FIG. 2, six radially equally spaced roll inlet ports 22 are visible and are offset 30 degrees from the set of six radially equally spaced roll inlet ports 22 on the opposite end of the perforation roll 12. Of course it is possible to have all twelve roll fluid lines 24 extend to the same end of the perforation roll 12, in which case twelve radially equally spaced roll inlet ports would be visible at the end of the perforation roll 12.

In the particular embodiment of the present invention illustrated in the figures, fluid flow or pressure exerted through the roll fluid lines 24 causes the blades 14 corresponding to those roll fluid lines 24 to extend into their web perforating positions. It is desirable to create perforations in a web at regular intervals along the length of the web. Various combinations of extended blades 14 can be identified to create such perforations. For the twelve-blade perforation roll 12 shown in the figures, the following extended blade combinations will produce regularly spaced perforations in a web passing the perforation roll 12: one blade 14, two blades 14 separated from each other by 180 degrees, three blades 14 separated from each other by 120 degrees, four blades 14 separated from each other by 90 degrees, six blades 14 separated from each other by 60 degrees, and twelve blade 14 separated from each other by 30 degrees. Different extended blade combinations produce different lengths between perforations in the web. Therefore, different combinations of pressurized roll fluid lines 24 are necessary to vary the length between perforations in the web. For this purpose, the rotary phase plate 10 of the present invention has a series of phase plate apertures 26 which can be aligned (via rotation of the rotary phase plate 10) to place selected roll inlet ports 22 and roll fluid lines 24 in fluid communication with a fluid or pressure source via the rotary union 20.

Figure 4B:
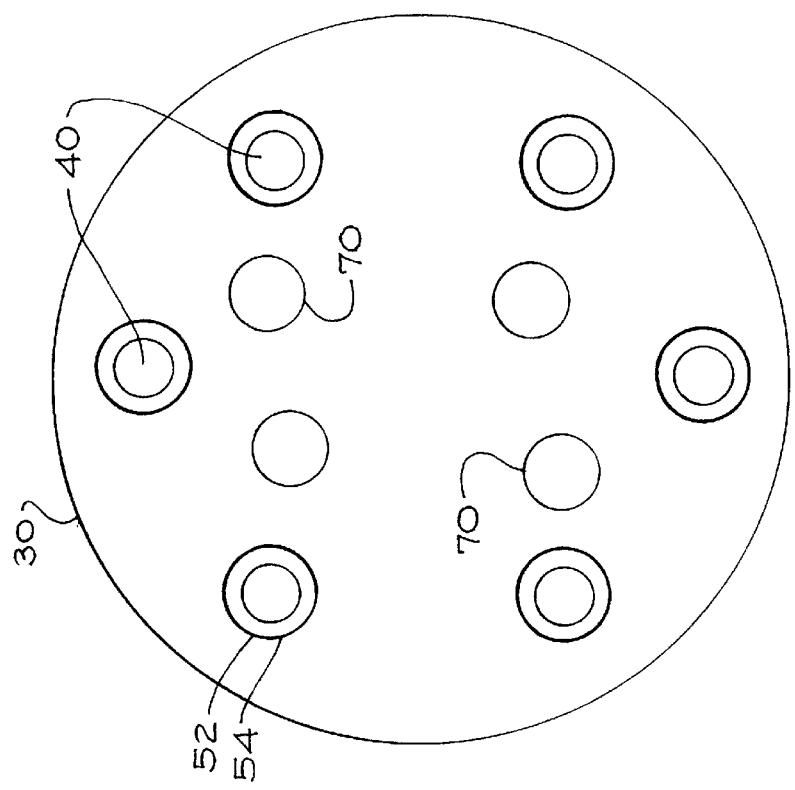
FIG. 4b is an elevational view of the face of the roll adapter facing the rotary phase plate in FIGS. 1–3.
Figure 4A:
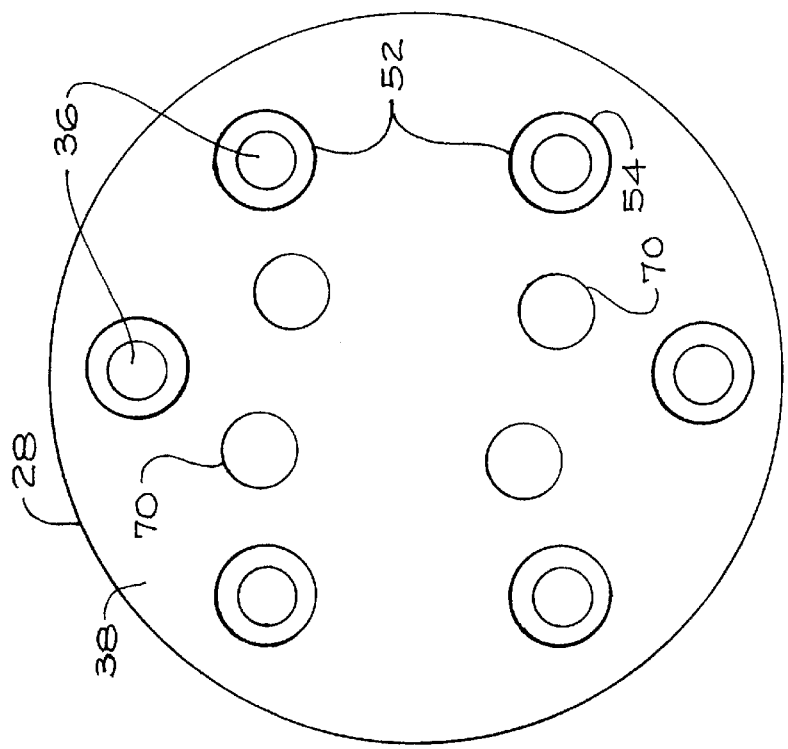
FIG. 4a is an elevational view of the face of the rotary union adapter facing the rotary phase plate in FIGS. 1–3.

The most highly preferred embodiments of the present invention employ a rotary union adapter 28 and a roll adapter 30 to connect the rotary phase plate 10 between the rotary union 20 and the roll inlet ports 22 on the end of the perforation roll 12. The rotary union adapter 28 connects the rotary union 20 to the rotary phase plate 10, and the roll adapter 30 connects the rotary phase plate 10 to the end of the perforation roll 12. As best shown in FIG. 3, the rotary union adapter 28 has a rotary union inlet 32 which connects in a conventional manner to the rotary union 20. Extending from the rotary union inlet 32 is preferably six equally spaced rotary union adapter radial fluid lines 34 which join with six equally spaced rotary union adapter ports 36 open to the roll side 38 of the rotary union adapter 28. Therefore, the roll side 38 of the rotary union adapter 28 has a circle of six equally spaced rotary union adapter ports 36 as best shown in FIG. 4a. As shown in FIG. 4b, the roll adapter 30 has a series of six equally spaced roll adapter ports 40 aligned with the rotary union adapter ports 36 on the roll side 38 of the rotary union adapter 28. Six equally spaced roll adapter radial fluid lines 44 extend from the roll adapter ports 40 toward the rotational axis of the roll adapter 30. These roll adapter radial fluid lines 44 terminate in a series of roll adapter outlets 48 extending axially to the roll side 50 of the roll adapter 30 facing the perforation roll 12. The roll adapter outlets 48 on the roll side 50 of the roll adapter 30 are aligned with the six roll inlet ports 22 on the end of the perforation roll 12 (described above).

With the above fluid line and port configuration of the rotary union 20, adapters 28, 30 and perforation roll 12, pressurized fluid can be forced from the rotary union 20 through six different paths to the six roll fluid lines 24 open to the end of the perforation roll 12 (i.e., from the rotary union 20, through all six sets of ports and fluid lines in the adapters 28, 30, and into the six ports and fluid lines at the end of the perforation roll 12). As will be discussed in more detail below, the rotary phase plate 10 is employed to selectively block and open the six paths for controlling fluid flow and/or pressure in the perforation roll fluid lines 24 and to thereby control extension and retraction of the blades 14 on the perforation roll 12. Therefore, the rotary phase plate 10 is provided with the phase plate apertures 26 arranged in a pattern such that rotation of the rotary phase plate 10 with respect to the rotary union adapter 28 and the roll adapter 30 changes the number and/or location of open lines from the rotary union 20 to the perforation roll 12.

In the preferred embodiment of the present invention illustrated in the figures, both ends of the perforation roll 12 have a valve assembly (identified by reference numeral 2, and preferably including the rotary union 20, rotary union adapter 28, roll adapter 30 and rotary phase plate 10) thereon. The valve assemblies 2 and their six associated roll inlet ports 22 and six roll fluid lines 24 are out of phase with one another by 30 degrees to create the 12 equally and radially spaced roll fluid lines 24 in the perforation roll 12. As indicated above, it is possible to have only one valve assembly 2 on one end of the perforation roll 12, in which case all 12 roll fluid lines 24 would extend to 12 roll inlet ports 22 on one end of the perforation roll 12. Rather than having six sets of fluid lines and ports associated with the adapters 36, 40, the valve assembly 2 would have 12 such sets all running from one rotary union 20 to the end of the perforation roll 12.

The rotary phase plate 10 is preferably rotatable about its axis by a user. Rotation of the rotary phase plate 10 causes each of the phase plate apertures 26 to become substantially aligned with or misaligned from the ports 36, 40 in the rotary union adapter 28 and the roll adapter 30, thereby opening or closing (respectively) fluid lines from the rotary union 20 to the perforation roll 12 and controlling operation of the blades 14. To create the desired regular spacing between perforations of the web passing the perforation roll 12, the extended blades 14 on the roll 12 are selected to be spaced apart equally about the circumference of the perforation roll 12. Although the possible positions and numbers of extended blades 14 meeting this criteria was discussed above, a perforation roll capable of producing three, four, and six perforations per rotation as selected by a user is most desirable. Therefore, and by way of example only, a rotary phase plate 10 adapted for producing three, four, and six perforations per rotation will now be described.

Figure 5:
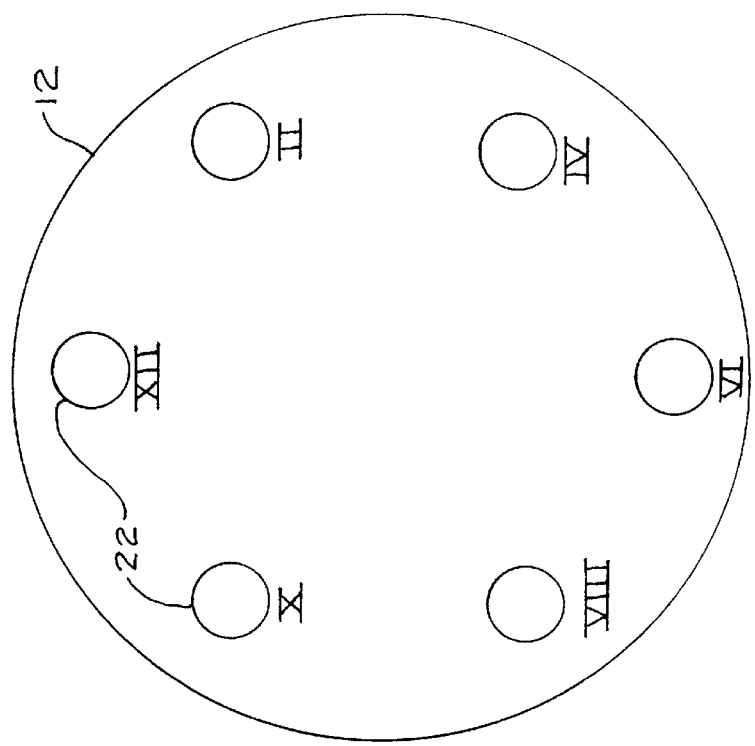
FIG. 5 is an elevational view of the ends of the perforation roll illustrated in FIGS. 1–3.
Figure 5:
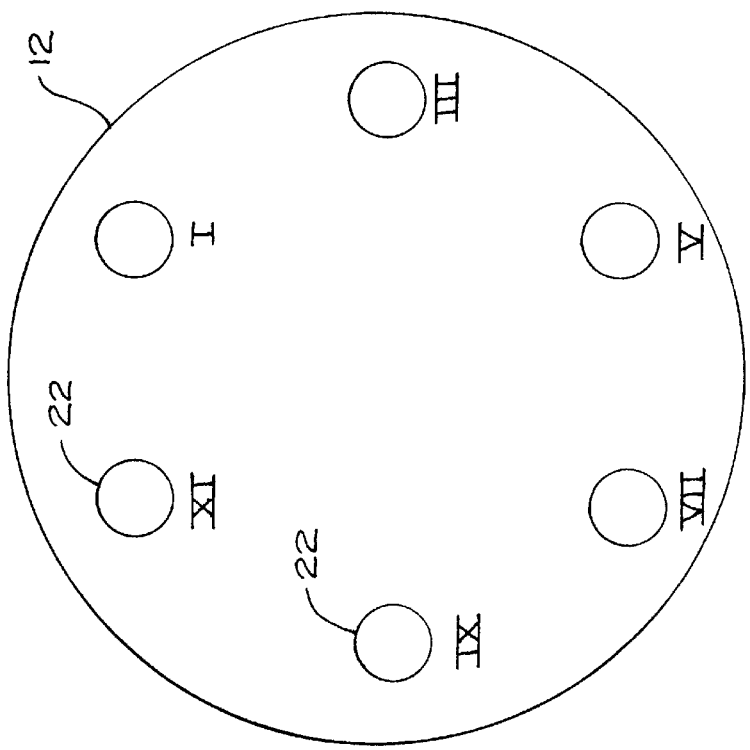

To produce six equally spaced perforations in one rotation of the perforation roll 12, six equally spaced blades 14 must be extended from the surface of the perforation roll 12. If the preferred embodiment of the present invention has six roll fluid lines 24 extending to one end of the perforation roll 12 and six roll fluid lines 24 extending to an opposite end (with the two sets of lines misaligned with respect to one another by 30 degrees), all lines to one end of the perforation roll must be opened to produce six equally spaced extended blades 14. This can best be visualized with reference to FIGS. 5, illustrating both ends of the preferred embodiment perforation roll 12 side by side, numbered with romanette numerals i-xii corresponding to the hour positions on a clock face (for purposes of clarity, mounting holes 70 in the ends of the perforation roll 12 have been removed from FIG. 5). Therefore, a rotary phase plate 10 must have six equally spaced apertures 26 to align with all six of the adapter ports 36, 40 on both sides of the rotary phase plate 10 (see FIG. 6a). To produce four equally spaced perforations in one rotation of the perforation roll 12, four equally spaced blades 14 must be extended from the surface of the perforation roll 12. Referring again to FIG. 5, two lines (180 degrees apart) must be opened from each set of six lines running to the opposite ends of the perforation roll 12. Therefore, each rotary phase plate 10 must have two apertures 26 separated by 180 degrees to align with adapter ports 36, 40 separated 180 degrees apart on the rotary union adapter 28 and the roll adapter 30 (see FIG. 6b). To produce three equally spaced perforations in one rotation of the perforation roll 12, three equally spaced blades 14 must be extended from the surface of the perforation roll 12. Referring once again to FIG. 5, one line must be opened on one set of six lines running to one end of the perforation roll 12 and two lines flanking and 120 degrees apart from the line must be opened on the other set of six lines running to the opposite end of the perforation roll 12. Therefore, each rotary phase plate 10 is preferably provided with three apertures 26 separated from each other by 120 degrees to align with similarly spaced adapter ports 36, 40 on the rotary union adapter 28 and the roll adapter 30 (see FIG. 6c).

Figure 6D:
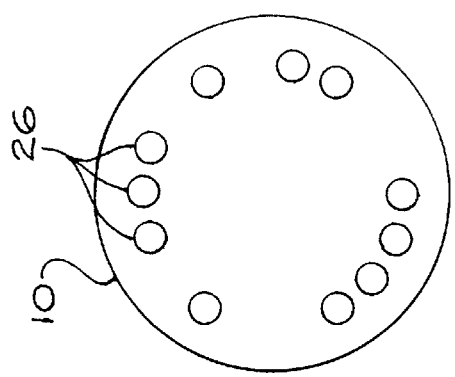
FIG. 6d is a schematic view of the rotary phase plate illustrated in FIGS. 1–3, showing the preferred locations of the phase plate apertures.
Figure 6C:
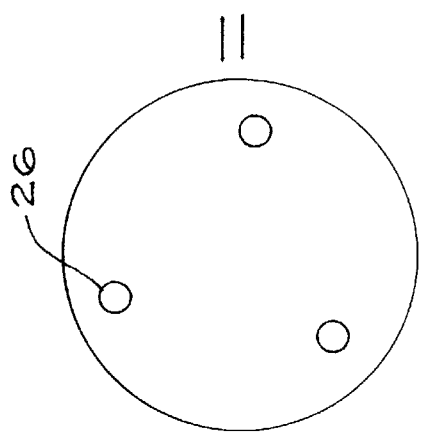
FIG. 6c is a schematic view of a rotary phase plate showing phase plate aperture locations for opening two of three equally-spaced lines from the valve assembly to the perforation roll.
Figure 6B:
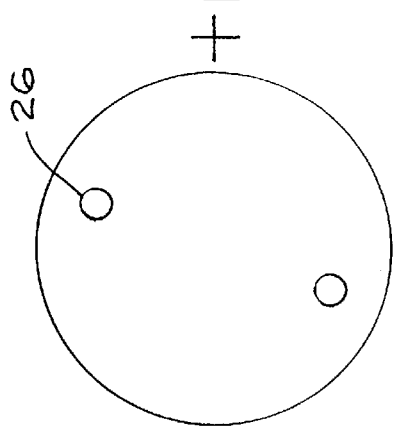
FIG. 6b is a schematic view of a rotary phase plate showing phase plate aperture locations for opening two equally-spaced lines from the valve assembly to the perforation roll.
Figure 6A:
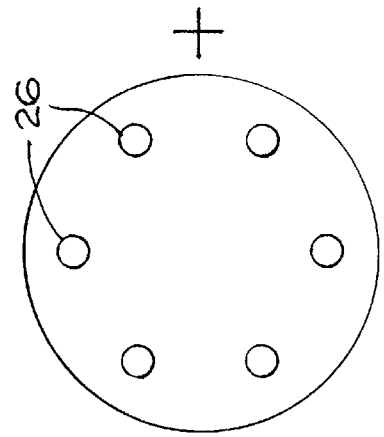
FIG. 6a is a schematic view of a rotary phase plate showing phase plate aperture locations for opening six equally-spaced lines from the valve assembly to the perforation roll.

Having identified the three aperture configurations needed to open up equally spaced sets of 6, 4, and 3 roll fluid lines 24 in the perforation roll 12 (to extend blades 14 corresponding to these fluid lines 24), the desired rotary phase plate 10 has all three aperture configurations as shown in FIG. 6d. Changing the perforation roll 12 from one of the extended knife configurations to another is therefore accomplished by rotating the rotary phase plate 10 with respect to the rotary union adapter 28 and the roll adapter 30. Such rotation closes and removes air pressure to a set of lines in one set of ports 36, 40 and opens and pressurizes another set of lines in another set of ports 36, 40.

It will be appreciated by one having ordinary skill in the art that a number of other aperture configurations can be employed which are different than that shown in FIG. 6d. The particular configuration desired will necessarily produce different combinations of pressurized roll fluid lines as the rotary phase plate 10 is rotated, some configurations resulting in equally spaced pressurized roll fluid lines (and extended blades 14) and some not. In all such aperture configurations however, the apertures 26 should be sized and positioned so that no part of an aperture 26 extends between ports 36, 40 of a line which is to be closed in a particular configuration.

Much higher reliability is achieved by having only one rotary union seal for each valve assembly 2 as opposed to multiple seals on multi-port rotary unions. Such a design also significantly reduces the design complexity and manufacturing, assembly, and maintenance expense inherent in systems employing multi-port rotary unions.

To obtain a fluid-tight seal between the rotary phase plate 10 and the adjacent rotary union adapter 28 and roll adapter 30, the ports 36, 40 of the rotary union adapter 28 and the roll adapter 30 are each preferably provided with an O-ring 52 (see FIGS. 4a and 4b). More preferably, the O-rings 52 are fitted within O-shaped recesses 54 in the faces of the adapters 28, 30. To obtain a fluid-tight seal between the roll adapter 30 and the perforation roll 12, O-rings 56 (see FIG. 3) are located around the roll adapter outlets 48 and roll inlet ports 22, and are also preferably fitted within O-shaped recesses 58 in the facing surfaces of the roll adapter 30 and the perforation roll 12. Of course, other fluid-sealing elements such as other types of rings, gaskets, seals, and sealing materials well known to those skilled in the art can also be used to create reliable seals between the elements discussed above. However, it should be noted that the seal between the rotary phase plate 10 and the adapters 28, 30 preferably permits rotation or other movement of the rotary phase plate 10 with respect to the rotary union adapter 28 and the roll adapter 30. For this reason, the types of fluid sealing elements and materials usable between the rotary phase plate 10 and the adapters 28, 30 is more limited, particularly to those elements and materials such as recessed low wear O-rings which can maintain a fluid-tight seal after repeated movement between the sealed elements.

To prevent unwanted slipping or rotation of the rotary phase plate 10 with respect to the rotary union adapter 28 and the roll adapter 30 (especially during rotation of the perforation roll 12), and to further obtain a fluid-tight seal between the rotary phase plate 10 and the adapters 28, 30, the rotary phase plate 10 is preferably snugly sandwiched between the rotary union adapter 28 and the roll adapter 30. This relationship ran be obtained in a large number of ways well known to those skilled in the art, such as by conventional fasteners connecting the rotary union adapter 28 and the roll adapter 30 together, by a light interference fit between central portions of the rotary union adapter 28 and the roll adapter 30, by magnetic or electromagnetic force between the rotary union adapter 28 and the roll adapter 30 or between the adapters 28, 30 and the rotary phase plate 10, friction-inducing material located upon or between those surfaces of the rotary union adapter 28 and the roll adapter 30 which face one another, etc. However, in the most highly preferred embodiments of the present invention, two threaded fasteners 60 are passed into matching holes in the rotary union adapter 28 and the roll adapter 30, and are tightened therein to exert a slight compression upon the O-rings 52 between the adapters 28, 30. These O-rings 52 can provide sufficient friction between the rotary phase plate 10 and the adapters 28, 30 to prevent unwanted slipping or rotation of the rotary phase plate 10.

Still other elements, devices, and materials can also or instead be used to prevent unwanted rotation of the rotary phase plate 10 with respect to the rotary union adapter 28 and the roll adapter 30, and fall within the spirit and scope of the present invention. For example, the preferred embodiment of the present invention also has at least one spring-loaded ball plunger 62 (essentially, a spring-biased ball bearing) fitted within a receiving hole 64 in one of the adapters 28, 30, positioned to press against the rotary phase plate 10 when the valve assembly 2 is assembled. Preferably, the rotary phase plate 10 has a series of preferably radial detents 66 therein (see FIG. 2) spaced circumferentially around the rotational axis of the rotary phase plate 10. The ball of the spring-loaded ball plunger 62 falls into the detents 66 as the rotary phase plate 10 is rotated, thereby further preventing unwanted rotary phase plate rotation with respect to the rotary union adapter 28 and the roll adapter 30. Of course, the spring, ball and detent structure just described can be replaced by other structures or devices operating in a comparable manner, such as spring-loaded pins, a ratchet and pawl structure, and the like.

Preferably, the rotary phase plate 10 of the present invention is provided with structure or elements which assist in turning the rotary phase plate 10 with respect to the rotary union adapter 28 and the roll adapter 30. For example, the rotary phase plate 10 can have one or more rotation apertures 68 therethrough (see FIGS. 1 and 2) accessible to a user when the valve assembly 2 is assembled. A tool (not shown) can be inserted in any one of the rotation apertures 68 to provide for a grasping point for turning the rotary phase plate 10. The rotary phase plate 10 can instead or additionally be provided with one or more recesses, protruding elements, or other structural features which can be used (in conjunction with a tool or not) to help a user grasp and turn the rotary phase plate 10.

The rotary phase plate 10 also preferably has indicia in the form of lettering, words, symbols, graphics, or other markings upon a surface thereof to indicate the position of the rotary phase plate 10 with respect to the rotary union adapter 28 and/or the roll adapter 30 and the perforation roll 12. The indicia can be a series of radial lines across the surface of the rotary phase plate 10 and radially aligned with the various apertures 26 in the rotary phase plate 10. Alternately, the indicia can be any other type of marking providing information to a user regarding the physical orientation of the rotary phase plate apertures 26 with respect to visible portions of the rotary phase plate 10 when the valve assembly 2 is assembled. Such indicia is particularly helpful because when the valve assembly 2 is assembled, it can be difficult or impossible to identify the orientation of the apertures 26 in the rotary phase plate 10 with respect to the ports 36, 40 in the adapters 28, 30, and therefore to tell which roll fluid lines 24 are pressurized and which ones are not without turning on and/or operating the machine in which the perforation roll 12 is installed.

Each valve assembly 2 of the present invention is preferably attached to an end of the perforation roll 12 via a pair of mounting fasteners 72 passed through at least the roll adapter 30 (and more preferably, through both the rotary union adapter 28 and the roll adapter 30) and into mounting holes (not shown) in the end of the perforation roll 12. The mounting fasteners 72 are preferably bolts, but can be virtually any type of fastener capable of securing the valve assembly 2 to the end of the perforation roll 12. For example, the valve assembly 2 can be attached to the perforation roll 12 by other conventional fasteners (threaded or otherwise), welding, brazing, adhesive, cohesive, or other bonding material, and the like. The valve assembly 2 can even be made integral with the perforation roll 12 by, for example, making the roll adapter 30 integral to the perforation roll 12.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention as set forth in the appended claims. For example, particularly where equally-spaced web perforations are not desired or necessary, a large number of phase plate aperture configurations are possible which open combinations of fluid lines from the rotary union 20 to the perforation roll 12 to extend any desired combination of blades on the perforation roll 12. Also, where two phase plate assemblies 2 are employed in the present invention, the rotary phase plates 10 need not be identical and angularly offset on both ends of the perforation roll 12. Specifically, because virtually any configuration for either rotary phase plate 10 is possible, there need not be any particular relationship between the number and position of phase plate apertures 26 on one end of the perforation roll 12 and the number and position of phase plate apertures 26 on an opposite end of the perforation roll 12.

It should also be noted that the particular number and arrangement of ports and fluid lines employed in the rotary union adapter 28, the roll adapter 30, and perforation roll 12 of the preferred embodiment described above is not a necessary requirement to practice the present invention. More or fewer ports and fluid lines can be arranged in virtually any configuration within the rotary union adapter 28, the roll adapter 30 and the perforation roll 12 (i.e., being unequally spaced apart from one another, being located on only one or more radial sections of the rotary union adapter 28, the roll adapter 30 and/or the perforation roll 12, being arranged in a oval, square, plus-shaped, star-shaped, or other pattern, etc.). Of course, such other port and fluid line arrangements in the rotary union adapter 28, roll adapter 30 and the perforation roll 12 can significantly impact the configuration of the perforation roll 12, including for example the arrangement and location of blades 14 on the perforation roll 12.

Additionally, the above discussion regarding the present invention is with reference to a perforation roll 12 having blades 14 operated by the application or non-application of pressurized fluid to certain fluid lines in the adapters 28, 30 and perforation roll 12. The present invention is also particularly useful for other types of rotating members in which pressure or flow control is necessary or helpful. For example, the valve assembly 2 of the present invention can be used for cutoff roll blades 14 in which a web is cut rather than perforated, or for anvil rolls in which one or more anvils are selectably extended to impact cutoff or perforation blades. The valve assembly 2 can also be used not only to extend and/or retract blades of various types, but also to blow air out of apertures in the surface of the rotating roll (such as for controlling web movement around the roll). In addition, rather than admit forced fluid into the rotating roll, the present invention can be used for applications in which fluid is sucked out of the rotating roll. To this end, a vacuum source can be supplied to the rotary union 20 which in turn supplies vacuum through open lines to the perforation, cutoff, or vacuum roll. Use of vacuum pressure rather than pressurized fluid permits different types of blade extension and retraction mechanisms to be used, and facilitates the use of suction to retain or control a web upon selected portions of the surface of the roll by means of vacuum apertures in the roll. In short, the present invention can be used in connection with fluid pressure systems or fluid vacuum systems, with systems in which blades are retracted by vacuum or pressurized fluid and/or in which blades are extended by vacuum and/or pressurized fluid, and with systems in which fluid is sucked into and/or blown out of holes in the roll.

Though not preferred, alternate embodiments of the present invention having one or no adapters 28, 30 are possible. For example, in one alternate embodiment, the rotary phase plate 10 is attached directly to the perforation roll 12 in conventional manner as described above with reference to connection of the valve assembly 2 to the perforation roll 12. Such a design is particularly applicable in cases where the diameter of the end of the perforation roll 12 approaches the diameter of the roll adapter 30. However, if the equal spacing between roll fluid lines 24 in the perforation roll 12 is to be retained, it is necessary to extend fluid lines through the thickness of the rotary phase plate 10 to align with the equally spaced roll fluid lines 24. A similar result is achieved when the rotary phase plate 10 is made integral to the roll adapter 30 of the preferred embodiment. In all such cases, the rotary phase plate 10 with its pattern of phase plate apertures 26 is still rotatable with respect to the rotary union adapter 28 and the rotary union adapter ports 36 therein. The operational principal of selectively aligning a pattern of phase plate apertures 26 with a set of rotary union adapter ports 36 is therefore the same as described above with reference to the preferred embodiment of the present invention.

In a similar vein to the alternative embodiment just described, in another alternative embodiment of the present invention, the rotary union 20 is coupled directly to the rotary phase plate 10. The rotary union adapter radial fluid lines 34 would not extend radially in an equally spaced manner from one another, but would instead preferably extend radially outward within the rotary phase plate directly to each aperture location 26 in the pattern of apertures 26 (such as the pattern illustrated in FIG. 6d). A similar result is achieved when the rotary phase plate 10 is made integral to the rotary union adapter 28 of the preferred embodiment. In all such cases, the rotary phase plate 10 with its pattern of phase plate apertures 26 is still rotatable with respect to the roll adapter 30 and the roll adapter ports 40 therein. The operational principal of selectively aligning a pattern of phase plate apertures 26 with a set of roll adapter ports 40 is therefore the same as described above with reference to the preferred embodiment of the present invention.

In yet another alternative embodiment of the present invention, the rotary union 20 is coupled directly to the rotary phase plate 10, which itself is coupled directly to the end of the perforation roll 12. In this embodiment, fluid lines corresponding to the rotary union adapter radial fluid lines 34 are located within the rotary phase plate 10 and extend from the rotary union 10 to the phase plate apertures 26 which themselves are exposed directly to the end of the perforation roll 12. The pattern of the phase plate apertures 26 can be rotated with respect to the roll inlet ports 22 so that the operational principal of selectively aligning a pattern of phase plate apertures 26 to a set of ports 22 to open a desired set of fluid lines from the rotary union 20 to the perforation roll 12 is still accomplished. Of course, to perform the function of rotating the rotary phase plate 10 in at least this embodiment of the present invention, the mounting fasteners 72 (and/or other fasteners) coupling the valve assembly 2 to the end of the perforation roll 12 may have to be partially or completely released and re-fastened after rotation of the rotary phase plate 10. This embodiment of the present invention is therefore not as preferable as the preferred embodiment of the present invention illustrated in the figures.

We claim:

1. A method of controlling fluid flow through at least one of a plurality of inlet ports included in a rotatably mounted roll, comprising:
   providing a plate coupled to the rotatably mounted roll and to a rotary union, the plate including a plurality of apertures;
   placing at least one of the plurality of apertures in fluid communication with at least one of the inlet ports when the plate is coupled for rotation with the rotatably mounted roll;
   moving the plate between desired positions with respect to the rotatably mounted roll to change which inlet ports are in fluid communication with apertures in the plate; and
   actuating at least one cutting member with fluid controlled by the position of the plate with respect to the rotatably mounted roll.

2. The method claimed in claim 1, further comprising:
   passing fluid through the rotary union to the plate; and
   passing fluid from the plate to the rotatably mounted roll.

3. The method claimed in claim 1, wherein the rotatably mounted roll is a perforation roll.

4. The method claimed in claim 1, wherein the plate is held in a desired position by a detent mechanism.

5. A fluid valve and roll assembly, comprising:
   a roll mounted for rotation about an axis, the roll having a plurality of inlet ports;
   a rotary union coupled to the roll;
   a plate including a plurality of apertures, the plate coupled to the rotary union and releasably coupled to the roll;
   the plate having at least one aperture in fluid communication with at least one of the inlet ports when the plate is coupled for rotation with the roll; and
   the plate being configured and arranged to move between desired positions with respect to the roll when the plate is at least partially released from its coupled state, wherein the roll includes at least one cutting member actuated by fluid flowing trough the at least one aperture.

6. The fluid valve and roll assembly claimed in claim 5, wherein each of the desired positions places a different number of apertures in fluid communication with a like number of inlet ports.

7. The fluid valve and roll assembly claimed in claim 5, wherein the plate is coupled for rotation with respect to the roll between the desired positions.

8. The fluid valve and roll assembly claimed in claim 1, wherein the plate is releasably coupled to the roll with a biased detent coupling and each of the desired positions corresponds to a detent engagement point.

9. The fluid valve and roll assembly claimed in claim 8, wherein the coupling is configured and arranged to allow slippage between the desired positions when a preselected torque is exceeded.

10. The fluid valve and roll assembly claimed in claim 5, further comprising a rotary union adapter coupled to the plate and placing the apertures in fluid communication with the rotary union.

11. The fluid valve and roll assembly claimed in claim 5, further comprising a rotating member adapter coupled to the plate and placing at least one of the plate apertures in fluid communication with the inlet ports.

12. The fluid valve and roll assembly claimed in claim 5, wherein the roll includes at least one axial line placing the at least one cutting member in fluid communication with the at least one aperture in the plate.

13. A fluid valve and roll assembly, comprising:
   a roll having a plurality of fluid lines therein and mounted for rotation about an axis;
   a rotary union coupled to the roll; and
   a plate between the roll and the rotary union and coupled for rotation with the roll, the plate having a plurality of apertures formed therethrough forming at least one pattern substantially coinciding with one or more inlet ports in the end of the roll, the plate positionably coupled with respect to the end of the roll between a plurality of desired positions, wherein the roll includes at least one cutting member actuated by fluid flowing through at least one of the plurality of apertures in the plate.

14. The fluid valve and roll assembly claimed in claim 13, wherein each of the desired positions places a different number of apertures in fluid communication with a like number of inlet ports.

15. The fluid valve and roll assembly claimed in claim 13, further comprising a rotary union adapter coupled to the plate and placing the apertures in fluid communication with the rotary union.

16. The fluid valve and roll assembly claimed in claim 13, further comprising a roll adapter coupled to the plate and placing at least one of the plate apertures in fluid communication with the inlet ports.

17. The fluid valve and roll assembly claimed in claim 13, wherein at least one of the plurality of fluid lines places the at least one cutting member in fluid communication with the at least one of the plurality of apertures in the plate.

* * * * *